US006347610B1

(12) United States Patent
Norton

(10) Patent No.: US 6,347,610 B1
(45) Date of Patent: Feb. 19, 2002

(54) ENGINE

(76) Inventor: Cyril Andrew Norton, The Old Meeting House, Abbey Wall Road, Pittenweem, Fife, KY10 2NE Scotland (GB)

( * ) Notice: Subject to any disclaimer, the term of this patent is extended or adjusted under 35 U.S.C. 154(b) by 0 days.

(21) Appl. No.: 09/446,401

(22) PCT Filed: Jun. 22, 1998

(86) PCT No.: PCT/GB98/01820

§ 371 Date: Feb. 29, 2000

§ 102(e) Date: Feb. 29, 2000

(87) PCT Pub. No.: WO98/59155

PCT Pub. Date: Dec. 30, 1998

(30) Foreign Application Priority Data

Jun. 20, 1997 (GB) ............................................. 9712925

(51) Int. Cl.[7] ............................................... F16H 21/30

(52) U.S. Cl. .................................................... 123/197.4

(58) Field of Search .......................... 123/197.1, 197.3, 123/197.4

(56) References Cited

U.S. PATENT DOCUMENTS

| | | | | | |
|---|---|---|---|---|---|
| 2,006,498 | A | * | 7/1935 | Dasset | 123/197.4 |
| 3,673,991 | A | * | 7/1972 | Winn | 123/56.7 |
| 4,387,672 | A | * | 6/1983 | Crocker | 123/54.3 |
| 4,553,508 | A | * | 11/1985 | Stinebaugh | 123/56.7 |
| 5,170,757 | A | * | 12/1992 | Gamache | 123/197.4 |

* cited by examiner

*Primary Examiner*—Noah P. Kamen
(74) *Attorney, Agent, or Firm*—Howard & Howard

(57) ABSTRACT

A method of operating an internal combustion reciprocating piston engine comprises the steps of: moving a piston (12) within a cylinder (10) to compress a charge in the cylinder (10) and igniting the compressed charge while the piston is being moved in the chamber at substantially constant or increasing velocity. The length, duration and pattern of at least one piston stroke may differ from the length, duration and pattern of another stroke.

22 Claims, 4 Drawing Sheets

ENGINE

BACKGROUND OF THE INVENTION FIELD OF THE INVENTION

This invention relates to an engine and a method of operating an engine, and in particular to a method of operating an internal combustion reciprocating piston engine. The invention also relates to a method of operating a reciprocating piston machine, which may take the form of an engine or a compressor.

DESCRIPTION OF THE RELATED ART

Since its conception the design and operation of the internal combustion engine has been subject to continuous development and improvement, with the result that the performance and emissions from such engines have improved dramatically. In recent years, efforts have focused on the aim of reducing undesirable engine emissions, such as the products of incomplete combustion (carbon monoxide (CO) and unburnt hydrocarbons (HC)), and oxides of nitrogen ($NO_x$), which are recognised as having a significant impact on the environment and human health.

Recent developments have included improving combustion from inducing higher turbulence in the fuel air charge, direct injection to improve fuel dispersion, and experiments with ignition energy and disposition of the point or points of ignition in the combustion chamber. Piston and combustion chamber design have also received attention to produce swirl and squish effects. However, it has been shown that turbulence and swirl change the pattern and length of the flame front from the point of ignition and may result in uneven burning of the charge in the combustion chamber, and an even slower overall rate of combustion. Experiments have been carried out using earlier ignition of the charge to counter the slower overall burn resulting from the swirl effects, however this has been found in some cases to exacerbate the $NO_x$ output, although it may lower CO and HC levels.

One of the most significant recent developments was the "lean burn" engine, with a view to reducing fuel consumption and reducing emissions of CO and HC. However, lean burn engines tend to produce relatively large amounts of $NO_x$, due to the excess oxygen present at the high temperatures and pressures reached, particularly if the duration of combustion is extended due to early ignition of the charge.

It is among the objectives of embodiments of the present invention to obviate or mitigate one or more of these disadvantages. In particular, it is an object of embodiments of the present invention to obviate or mitigate one or more of the disadvantages inherent in conventional engine design and thereby allow improvements in the combustion process, and further to facilitate adaptation of the performance characteristics of an engine to suit a particular application.

BRIEF SUMMARY OF THE INVENTION

According to one aspect of the present invention there is provided a method of operating an internal combustion reciprocating piston engine, the method comprising the steps of:

moving a piston within a chamber to compress a charge contained therein; and igniting the compressed charge while the piston is being moved in the chamber at substantially constant or increasing velocity.

According to another aspect of the present invention there is provided an internal combustion engine in which a piston is reciprocally movable in a piston chamber to compress a charge which is ignited during a latter portion of a compression stroke, the engine comprising:

a rotating power output member; and a connection between a piston and said power output member, characterised in that said connection includes means for moving the piston at a substantially constant or increasing velocity at the point of ignition.

The various aspects of the present invention will be primarily described herein with reference to four stroke spark ignited petrol engines comprising one or more cylinders, however aspects of the invention may also be applicable to engines utilising other fuels, such as natural gas, diesel oil and kerosene and engines operating on other cycles, such as the two stroke cycle, and compression ignition engines and engines utilising different ignition methods.

In conventional piston engines, each piston is directly connected to a rotating crankshaft by a piston rod. As a result, each piston moves harmonically and is travelling at maximum speed in mid-stroke. Thus, during the compression stroke, the piston accelerates from bottom dead centre (BDC), reaching maximum speed at mid stroke and thereafter decelerates at an increasing rate towards top dead centre (TDC). Ignition of the fuel/gas charge typically occurs between 25° and 45° before TDC, while the piston is decelerating from maximum speed, as dictated by the crankshaft piston connecting rod relationship. The relatively slow speed of the piston following ignition, up to and after TDC, results in the burning charge being maintained at high temperature and pressure for a relatively long period, thereby increasing the likelihood of the creation of undesirable combustion products, particularly $NO_x$. In contrast, in the present invention, the piston is moving at a substantially constant or increasing velocity at the point of ignition. Although not wishing to be bound by theory, it is believed that the substantially constant or increasing velocity of the piston creates a positive and stable pressure gradient or pressure wave in front of the piston. The pressure wave will interact with the advancing flame front, increasing the flame speed and reflecting the flame back towards the roof of the combustion chamber, resulting in a faster overall combustion process, such that combustion of the charge occurs evenly and in a relatively short time interval. The ability to attain complete combustion in a shorter time interval allows the expansion or working stroke to commence earlier than has so far been practical, without the penalty of incomplete combustion. Thus, the combustion process is completed in conditions of lower turbulence and, therefore, more evenly and in minimum time, resulting in the production of minimum CO and HC components, and as the burning charge is maintained at high temperature and pressure for a shorter time the production of nitrous oxides is also minimised.

The mechanical configuration of the engine and in particular the configuration of the connecting means may take any suitable form, and may include an arrangement of cams and cranks, gears, cranks, eccentric drives and the like as will be apparent to those of skill in the art.

Preferably, the connection between the piston and the output member is arranged such that maximum torsional effect can be applied to the output member during an initial or earlier portion of the power or working stroke, when the pressure of the burning charge is at or near a maximum, and thus the output torque will be superior to a conventional engine. This may be enhanced by providing a relatively low piston descent rate following TDC, thereby allowing a more efficient utilisation of maximum heat release and, as a result, high cylinder pressure providing high torsional effort at the power output member.

Preferably, the piston speed is substantially constant or increasing at ignition of the charge.

Preferably also, the piston is moving at or around its maximum velocity when ignition is triggered.

According to another aspect of the present invention there is provided a reciprocating piston machine in which at least one of the length, duration and pattern of at least one piston stroke differs from the length, duration and pattern of another stroke.

In the case of a four stroke cycle all four strokes may differ in one or both of length and duration.

According to a further aspect of the present invention there is provided a four stroke reciprocating piston machine having a piston coupled to a rotating power output member, the four strokes corresponding to a 360° rotation of the output member.

In accordance with embodiments of these aspects of the invention, the piston stoke lengths and velocities within the four cycles may be adjusted individually to satisfy differing heat release rates for various types of fuels, improve exhausting, and give better pumping efficiencies and thus higher volumetric efficiency. For example, by reducing the time span of the compression stroke it is possible to increase the rate of compression, which together with the higher piston speed at ignition, will assist in speeding up flame front movement, thereby reducing the overall time span of the complete combustion phase, where time, temperature and pressure have a significant influence on the production of oxides within the burning charge.

Preferably, at least one of the length and duration of the stroke of the expansion or power cycle is shorter than another stroke, and may be up to 50% shorter than another stroke. The duration of the expansion or power stroke may be reduced in proportion to the degree of rotation of the output member that the shortened stroke represents, and may represent a 50° or more rotation of the output member, although the movement pattern may be adjusted to satisfy other requirements by means of changes in the coupling between the piston and the power output member and for example by cam profile changes. The relative reduction of stroke would typically be evident at the tail of the piston movement where cylinder pressure is low and torsional effort minimal. With relative reduction of the expansion stroke length, a similar relative reduction would also therefore apply to the stroke of the exhausting cycle. The duration of this stroke may remain at 90° rotation of the output member. Alternatively, a reduced period may be required to match or comply with the combined dynamics of the exhaust and induction systems.

The relative reduction in rotation of the output member during the expansion and exhaust strokes permit a relative extension of the duration of the induction stoke, to enable a longer "breathing period" on the induction stroke.

The induction stroke may correspond to rotation of between 80° and 150° of the output member to facilitate induction of the charge, air, or fuel and air mixtures and to match the flow dynamics of inlet tract and valve flow characteristics, and hence provide better volumetric efficiency, while also avoiding the problems associated with valve overlap. The compression stroke length will be the same as the induction stroke length, but the output member rotation to execute the compression stroke is preferably less than 90°, and may be as little as 40° rotation to provide a greater duration for the induction stroke, thereby enabling the combined kinematics of both strokes to be set for best pumping efficiency. The stroke length may also be shortened to permit changes of compression ratio.

Preferably, the piston speed will be held substantially constant or increasing during the last 25%–1% of the compression stroke, the specific piston kinematics being selected to suit particular fuels and operating cycles,. Ignition preferably takes place within the remaining 5% to 10% of the stroke before TDC. However, different fuels and operating conditions may require adjustment to the ignition setting to obtain ideal performance.

According to a further aspect of the present invention there is provided a method of operating a reciprocating piston machine in which a piston is connected to a rotating member and moves in one direction during a first induction stroke and in the opposite direction during a second compression stroke, and the degree of rotation of the rotating member is greater over said first stroke.

In use, the machine provides a longer duration on the induction phase and thereby improves the pumping efficiency of the machine.

According to a still further aspect of the present invention there is provided a method of operating a four-stroke reciprocating piston machine in which a piston is connected to a rotating member and moves in one direction during the first and third strokes and in the opposite direction during the second and fourth strokes, whereby the stroke length of the first induction stroke and the second compression stroke is greater than the stroke length of the third expansion stroke and the fourth exhaust stroke.

These aspects of the present invention may be used to advantage in the operation of compressors, pumps, and other machines, in addition to engines.

BRIEF DESCRIPTION OF THE SEVERAL VIEWS OF THE DRAWINGS

These and other aspects of the present invention will now be described, by way of example, with reference to the accompanying drawings, in which.

DETAILED DESCRIPTION OF THE INVENTION

Figure 1A:
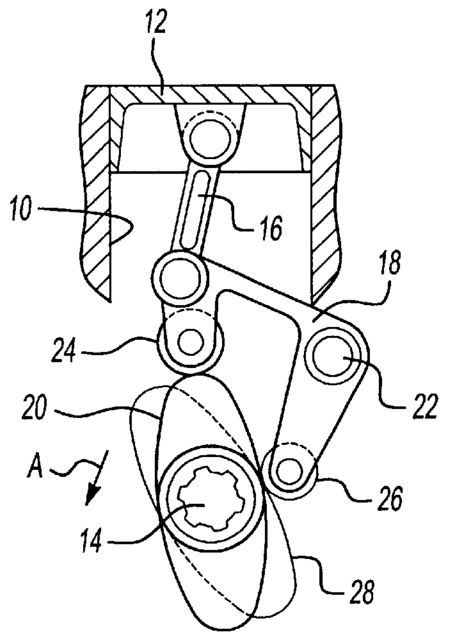
FIGS. 1*a*, 1*b*, 1*c* and 1*d* are sectional schematic illustrations of a piston arrangement in accordance with an embodiment of the present invention.
Figure 1B:
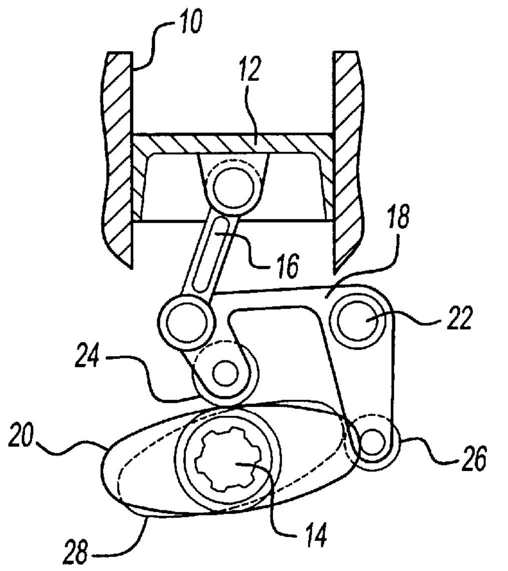
Figure 1C:
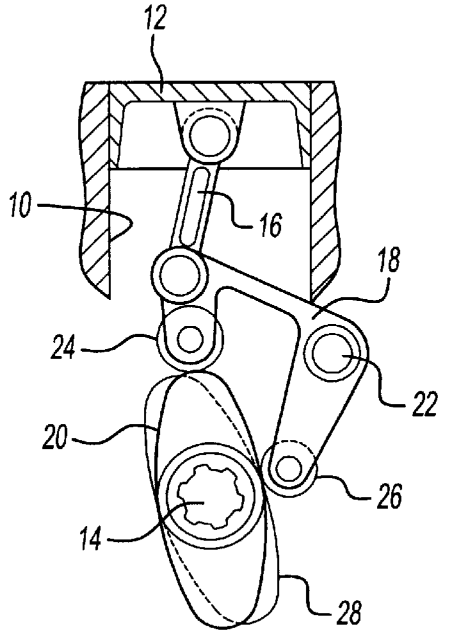
Figure 1D:
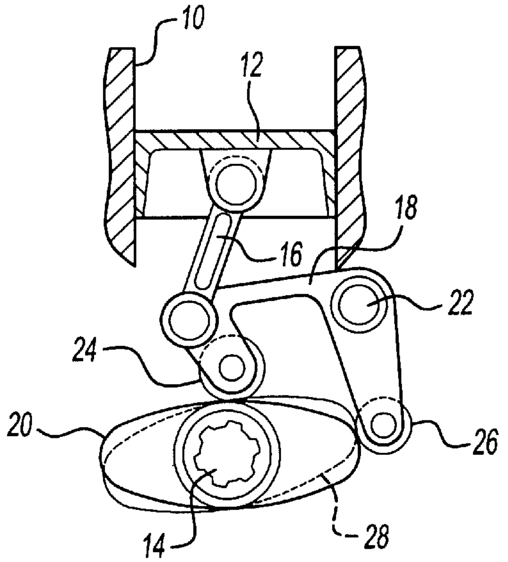

Reference is first made to FIGS. 1*a* to *d* of the drawings, which illustrate part of a cylinder 10 and a piston 12 of an engine in accordance with an embodiment of the present invention. The piston 12 is utilised to drive a rotating power shaft 14 in direction A via a piston rod 16, a bell crank 18 and a power cam 20. The bell crank 18 is pivotally mounted to the engine block, at 22, and includes a roller 24 for engaging the surface of the power cam 20. In addition, the crank 18 carries a further roller 26 for engaging a follower cam 28 mounted on the power shaft 14 adjacent the power cam 20. The configuration of the crank 18 and the cams 20, 28 translate the reciprocal movement of the piston 12 in the cylinder 10 to rotational movement of the power shaft 14. However, the movement of the piston 12 is not harmonic, as is the case in conventional reciprocating piston engines, as described below with reference to FIGS. 2 and 3 of the drawings.

Figure 2:
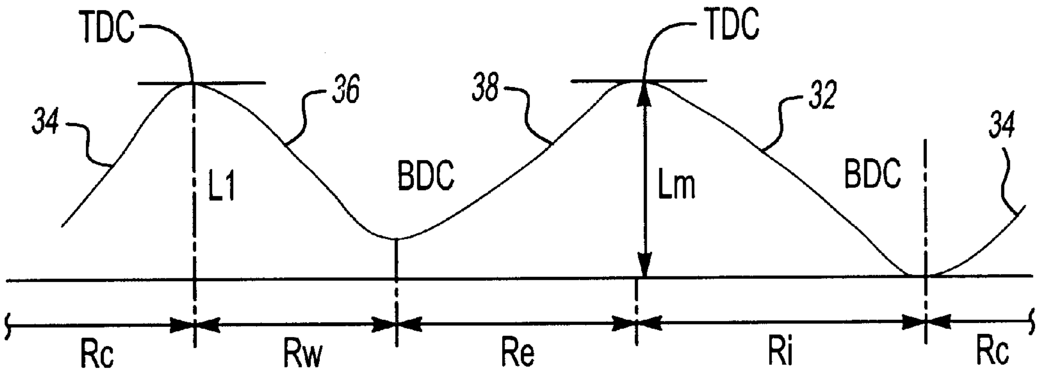
FIG. 2 is a graph illustrating the relative piston position with respect to the rotational position of the power output member of piston of FIGS. 1*a* to *d;*

Reference is first made to FIG. 2, which illustrates the different relative stroke lengths between cycles 36 and 38 and cycles 32 and 34 of the four strokes of an engine cycle. It will be noted that the four strokes translate to a 360° rotation of the power shaft 14, rather than the 720° rotation which would be the case in a conventional four stroke engine. This offers a number of advantages, one being the lower rotational speed of the power shaft 14, and the gears and the like connected thereto.

The cams 20, 28 and crank 18 are configured such that only the induction stroke 32 and the compression stroke 34 are likely to employ the maximum stroke length (Lm) or near the maximum stroke length that is available, while the power or working stroke 36 and the exhaust stroke 38 utilize a reduced proportion (typically 50–100%) of the maximum available stroke length Lm, depending on the performance characteristics required. This feature may be utilized to avoid the additional piston travel that is present at "end" of the working stroke and "beginning" of the exhaust stroke in a conventional engine, but which adds little if anything to the efficiency and output of the engine. Further, the reduction in the length of the working stroke 36 and the exhaust stroke 38 facilitates a reduction in the degree of rotation of the power shaft 14 ($R_w$, $R_e$) and corresponding reduction in the time necessary to complete both these strokes. Thus, the degree of rotation of the power shaft 14 to accomplish each of the working stroke 36 and the exhaust stroke 38 can be 90 degrees or less rotation of the power shaft 14 as controlled by the shape of cams 20 and 28. These savings can be transferred to induction stroke 32 ($R_i$) thereby giving the in-going charge more time to fill the cylinder 10 and hence leading to better airflow dynamics and thereby achieving greater volumetric efficiency. In some cases, this may reduce or obviate the need to provide turbo-chargers or superchargers, as the longer induction stroke will allow a greater mass of air to be drawn into the cylinder.

Figure 3:
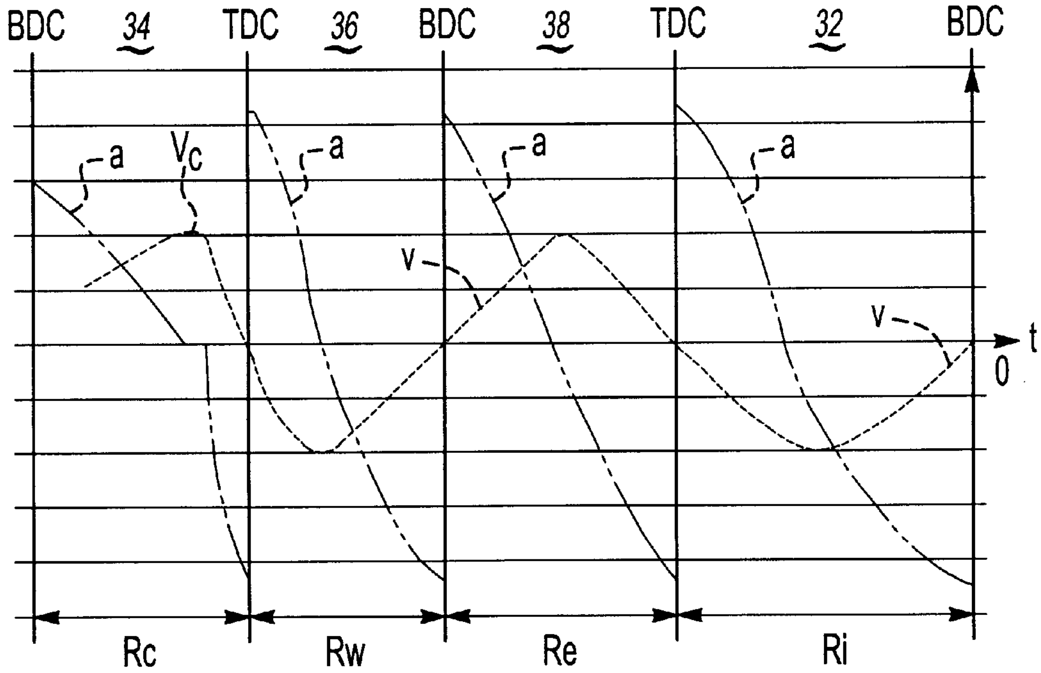
FIG. 3 is a graph illustrating the velocity and acceleration of the piston of FIGS. 1*a* to *d;*

Reference is now made to FIG. 3, which illustrates typical velocity time (v/t) and acceleration time (a/t) graphs for the piston 12 over the four strokes as illustrated in FIGS. 1*a* to *d*.

During the compression stroke 34 ($R_c$), the configuration of the cams 20, 28 is such that the piston 12 initially accelerates and then travels at constant velocity ($V_c$), ignition of the charge commencing at a latter stage of the constant velocity period. The increasing and then constant velocity of the piston 12 creates a positive and stable pressure gradient or pressure wave in front of the piston 12 and, with appropriate combustion chamber form, will assist in minimising turbulence in the cylinder 10, whereby the pressure wave having moved into the combustion space will interact with the advancing flame front from the point of ignition thereby increasing the flame speed and hence shorten the overall combustion process, such that combustion of the charge occurs evenly and in a relatively short time interval. The greater stability within the combustion chamber prior to the point of ignition facilitates more complete combustion, reducing output of CO and HC, and also reduces production of $NO_x$.

The piston 12 decelerates sharply following ignition, minimising the length of time where the mixture is maintained at high pressure and temperature. This contrasts with conventional engines, in which the relatively slow speed of the piston following ignition, up to and after TDC, results in the burning charge being maintained at high temperature and pressure for a relatively long period, increasing the likelihood of the creation of undesirable combustion products, particularly $NO_x$.

The piston movement over the remaining working, exhaust and induction strokes 36, 38, 32 follows a more regular pattern, but may be readily altered by changing the cam profiles to suit required engine or fuel characteristics.

Figure 4:
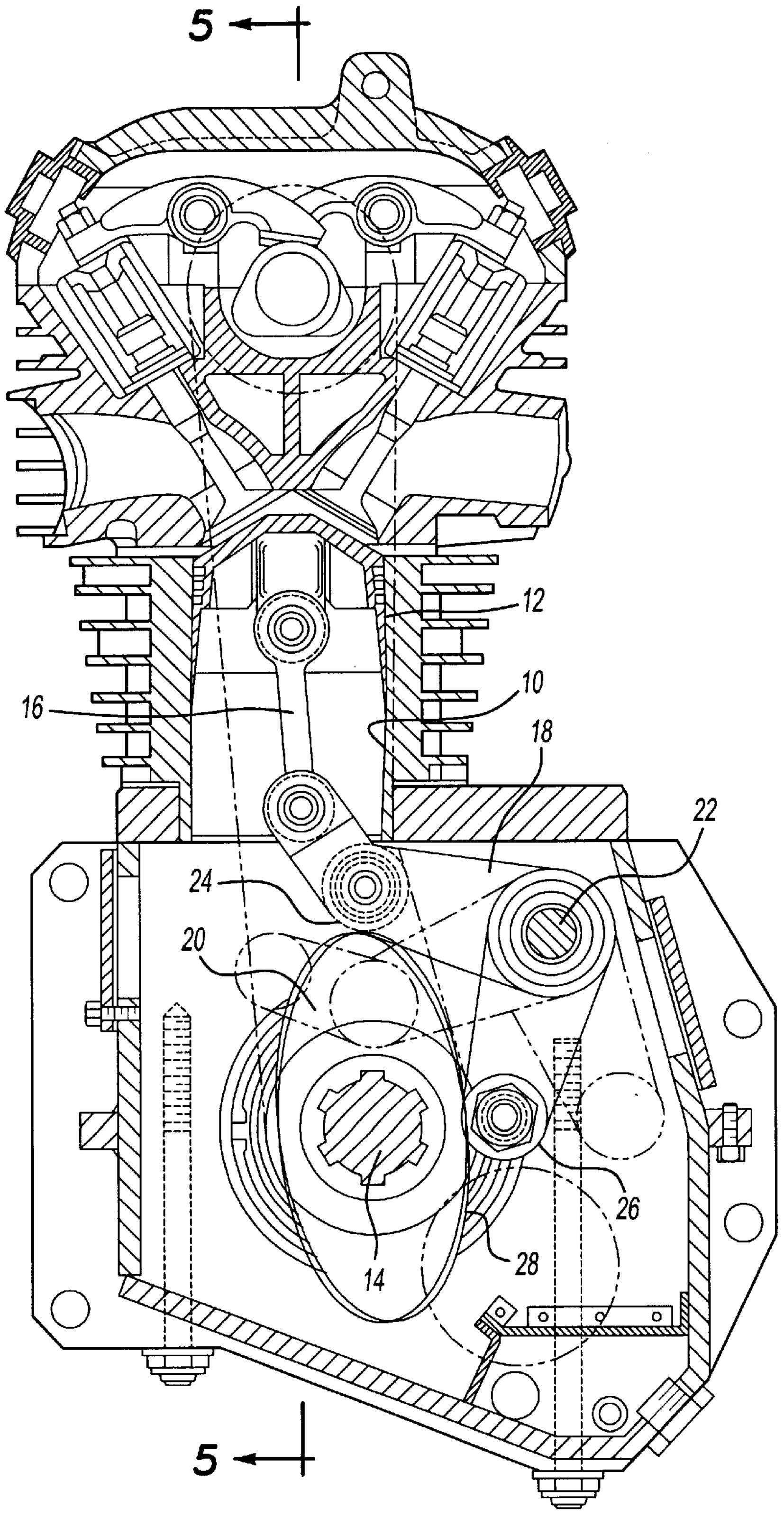
FIG. 4 is a sectional side view (on line 4—4 of FIG. 5) of an engine in accordance with an embodiment of the present invention.
Figure 5:
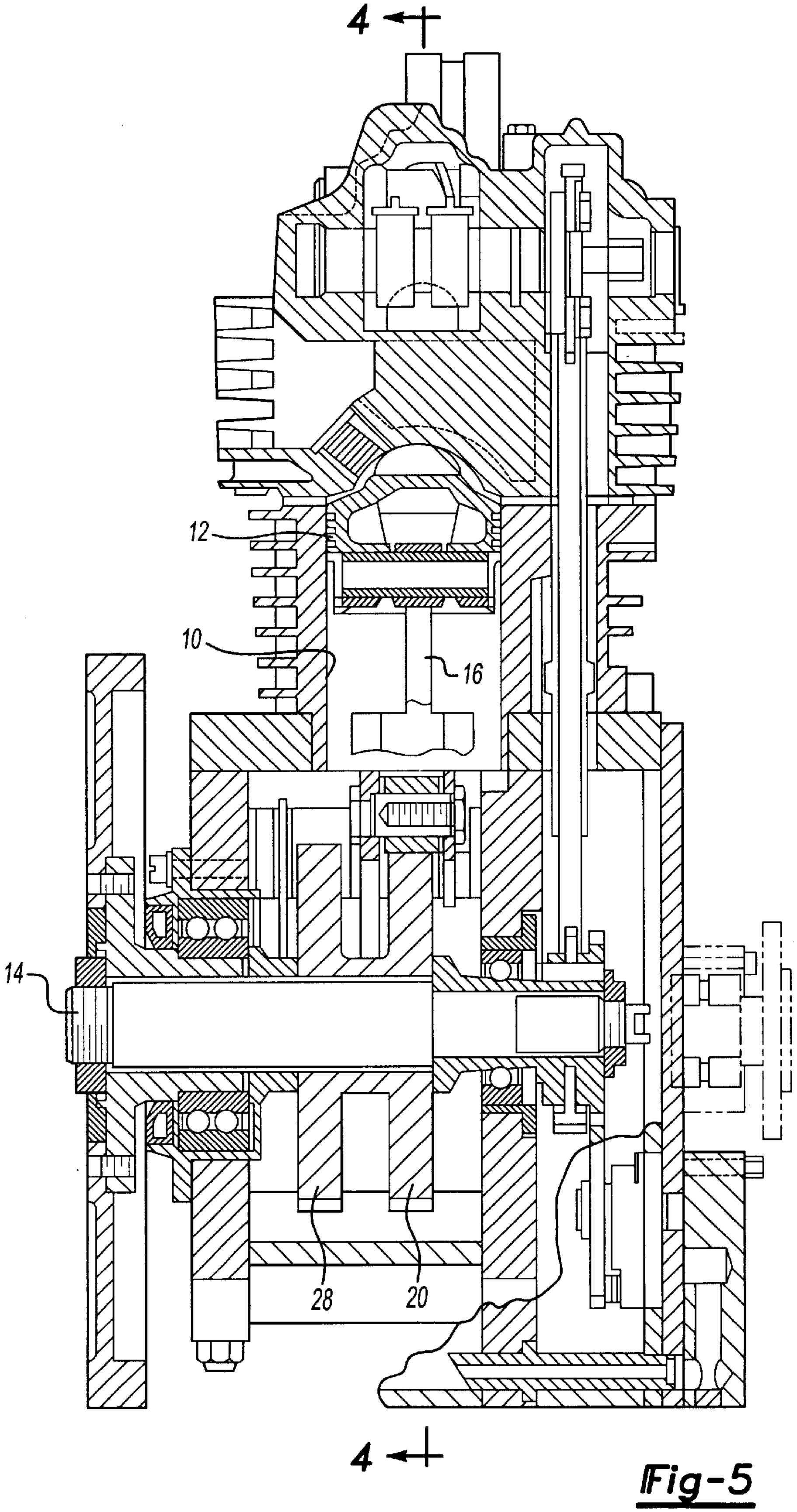
FIG. 5 is a part sectional view on line 5—5 of FIG. 4.

Reference is now made to FIGS. 4 and 5 of the drawings, which illustrate a single cylinder four stroke engine 50 in accordance with an embodiment of the present invention, and which engine operates as described above with reference to FIGS. 1, 2 and 3. The upper end of the engine 52 is from a Suzuki (Trade Mark) motorcycle engine and is substantially conventional with the bottom end of the engine including an arrangement of cams and cranks in accordance with a preferred embodiment of the present invention. For ease of reference, the components of the engine bottom end 52 have been identified with same reference numerals as used in relation to FIG. 1.

From the above description it will be clear to those of skill in the art that the engine configuration and operation as described above offers numerous significant advantages over conventional piston engines. Further, it will be clear to those of skill in the art that the desired pattern of piston movement, to achieve better overall combustion performance at the commencement of combustion and during the combustion process, may be achieved using many other mechanical arrangements in addition to the illustrated arrangement. For example, by provision of suitably profiled cams it will be possible to operate a two stroke engine, and of course engines in accordance with the present invention may have more than one cylinder; a horizontally opposed or broad V cylinder configuration is particularly suited to the cam and bell crank arrangement as described above.

What is claimed is:

1. A method of operating an internal combustion reciprocating piston engine of the type wherein a piston reciprocates in a chamber defined by an engine block, the method comprising the steps of:

providing a rotating power output member having a power cam and a follower cam;

providing a bell crank pivotally mounted to the engine block and pivotally coupled to the piston and having rollers engaging the power cam and the follower cam;

moving the piston in the chamber to compress a charge contained therein; and igniting the compressed charge while the piston is being moved in the chamber at substantially constant or increasing velocity.

2. The method of claim 1, wherein the piston velocity is substantially constant or increasing during the last 25%–1% of the compression stroke.

3. The method of claim 1 wherein ignition of the charge takes place within the remaining 10 to 5% of the compression stroke before TDC.

4. The method of claim 1, wherein the piston is moving at or around its maximum velocity at ignition.

5. The method of claim 1 wherein at least one of the length, duration and pattern of at least one piston stroke differs from the length, duration and pattern of another stroke.

6. The method of claim 5, wherein the engine operates on a four stroke cycle, and the piston moves through an induction stroke, a compression stroke, an expansion stroke, and an exhausting stroke.

7. The method of claim 6, wherein movement of the piston produces rotation of a power output member, the four strokes corresponding to a 360° rotation of the output member.

8. The method of claim 6, wherein at least one of the length and duration of the expansion stroke is shorter than another stroke.

9. The method of claim 8, wherein the duration of the expansion stroke is in proportion to the corresponding degree of rotation of a power output member operatively associated with the piston.

10. The method of claim 8, wherein at least one of the length and duration of the exhausting stroke corresponds to the at least one of expansion stroke length duration.

11. The method of claim 10, wherein the duration of the exhausting stroke corresponds to a 90° rotating of an output member operatively associated with the piston, and wherein the four strokes corresponds to a 360° rotation of the output member.

12. The method of claim 10, wherein the duration of the exhausting stroke corresponds to less than a 90° rotation of a power output member operatively associated with the piston, and wherein the four strokes correspond to a 360° rotation of the output member.

13. The method of claim 6 wherein at least one of the length and duration of the induction stroke is longer than another stroke.

14. The method of claim 6, wherein the compression stroke length is less than the induction stroke length.

15. The method of claim 1 wherein the engine operates on a four stroke cycle, and the piston is coupled to a rotating power output member, the four strokes corresponding to a 360° rotation of the output member.

16. The method of claim 15, wherein the induction stroke corresponds to a rotation of between 80° and 150° of the output member.

17. The method of claim 1, wherein the maximum torsional effect is applied to an output member coupled to the piston during an initial portion of a power stroke of the piston.

18. A method of operating an internal combustion reciprocating piston engine wherein the engine operates on a four stroke cycle, the cycles comprising an induction stroke, a compression stroke, an expansion stroke, and an exhausting stroke, the method comprising the steps of:

moving a piston in a first direction within a chamber to compress a charge contained therein; and igniting the compressed charge while the piston is being moved in the chamber in said first direction at substantially constant or increasing velocity; and wherein the compression stroke length corresponds to the induction stroke length.

19. An internal combustion engine in which a piston is reciprocally movable in a piston chamber to compress a charge which is ignited during a latter portion of a compression stroke, the engine comprising:

a rotating power output member including two cams; and a bell crank coupled between a piston and said power output member, characterized in that said bell crank bears upon a contour of the cams such that upon rotation of said power output member the piston moves at a substantially constant or increasing velocity at the point of ignition.

20. The engine of claim 19 wherein said two cams comprise a power cam and a follower cam.

21. The engine of claim 19, wherein the connecting between the piston and the output member is arranged such that maximum torsional effect is applied to the output member during an initial portion of a power stroke of the piston.

22. An internal combustion engine in which a piston is reciprocally movable in a piston chamber to compress a charge which is ignited during a latter portion of a compression stroke, the engine comprising:

an engine block;

a rotating power output member in the engine block; and a connection between a piston and said power output member, characterized in that said connection includes two cams comprising a power cam and a follower cam both coupled to the power output member and a bell crank pivotally mounted to the engine block and pivotally coupled to the piston and having rollers for engaging the power cam and the follower cam moving the piston at a substantially constant or increasing velocity at the point of ignition.

* * * * *